United States Patent [19]

Ngai et al.

[11] Patent Number: 4,888,682

[45] Date of Patent: Dec. 19, 1989

[54] PARALLEL VECTOR PROCESSOR USING MULTIPLE DEDICATED PROCESSORS AND VECTOR REGISTERS DIVIDED INTO SMALLER REGISTERS

[75] Inventors: Chuck H. Ngai; Edward R. Wassel, both of Endwell; Gerald J. Watkins, Endicott, all of N.Y.

[73] Assignee: International Business Machines Corp., Armonk, N.Y.

[21] Appl. No.: 327,405

[22] Filed: Mar. 20, 1989

Related U.S. Application Data

[63] Continuation of Ser. No. 903,934, Sep. 5, 1986, abandoned, which is a continuation of Ser. No. 538,318, Oct. 3, 1983, abandoned, which is a continuation-in-part of Ser. No. 530,842, Sep. 9, 1983.

[51] Int. Cl.$^4$ .............................................. G06F 9/18
[52] U.S. Cl. ................................. 364/200; 364/730; 364/748
[58] Field of Search ... 364/200 MS File, 900 MS File, 364/730, 736, 748

[56] References Cited

U.S. PATENT DOCUMENTS

| | | | |
|---|---|---|---|
| 3,106,689 | 10/1963 | Unger | 364/200 |
| 4,128,880 | 12/1978 | Cray, Jr. | 364/200 |
| 4,162,534 | 7/1979 | Barnes | 364/900 |
| 4,287,566 | 9/1981 | Culler | 364/754 |
| 4,435,765 | 3/1984 | Uchida et al. | 364/200 |
| 4,490,786 | 12/1984 | Nakatani | 364/200 |

FOREIGN PATENT DOCUMENTS

| | | |
|---|---|---|
| 0053457 | 6/1982 | European Pat. Off. |
| 8400226 | 1/1984 | World Int. Prop. O. |

OTHER PUBLICATIONS

F. L. Alt et al.: "Advances in Computers", vol. 7, 1966, Academic Press (New York, U.S.A.), J. C. Murtha: Highly Parallel Information Processing Systems, pp. 1–116, see pp. 14–17, paragraphs 2.2–2.2.3.

"The Architecture of Pipelined Computers" by Peter M. Kogge, 1981, p. 207.

IBM Technical Disclosure Bulletin, "Parallel Table Directed Translation", T. C. Chen et al., vol. 22, No. 6, Nov. 1979, pp. 2489–2490.

The 2938 Array Processor Overall Data Flow, IBM, 2/69, pp. 3-1 and 1-35.

*Primary Examiner*—Gary V. Harkcom
*Assistant Examiner*—Christopher H. Lynt
*Attorney, Agent, or Firm*—Arthur J. Samodovitz; David S. Romney; John H. Bouchard

[57] ABSTRACT

A pipelined parallel vector processor decreases the time required to process the elements of a single vector stored in a vector register. Each vector register of a plurality of vector registers is subdivided into a plurality of smaller registers. A vector, stored in a vector register, includes N elements; however, each of the smaller registers store M elements of the vector, where M is less than N. A pipelined element processor is associated with each smaller register for processing the M elements of the vectors stored in the smaller register and storing a result of the processing in a result register. Each of the smaller registers of the vector registers, and its corresponding element processor, comprise a unit. A plurality of units are connected in a parallel configuration. The element processors, associated with each unit, have been loaded with the result, the result being stored in a result register. Each of the results are processed in parallel fashion, as a result of the parallel configuration of the plurality of units. Therefore, the time required to process the elements of a single vector, stored in a vector register, is decreased.

9 Claims, 5 Drawing Sheets

PARALLEL VECTOR PROCESSOR USING MULTIPLE DEDICATED PROCESSORS AND VECTOR REGISTERS DIVIDED INTO SMALLER REGISTERS

CROSS REFERENCE TO RELATED APPLICATIONS

This application is a continuation of application Ser. No. 903,934 filed on Sept. 5, 1986, now abandoned which is a continuation of Ser. No. 538,318 filed on Oct. 3, 1983, now abandoned which is a continuation-in-part of application Ser. No. 530,842 filed Sept. 9, 1983.

This application is also copending with commonly assigned patent application Ser. No. 320,889 filed on Mar. 8, 1989 by Ngai and Watkins.

BACKGROUND OF THE INVENTION

1. Field of the Invention

The present invention pertains to a computer system, and more particularly, to an interelement processor associated with a parallel vector processor in said computer system for rapidly processing the elements of a single vector and for storing the results of said processing.

2. Description of the Prior Art

A typical vector processor, such as that shown in FIG. 1, includes a plurality of vector registers, each vector register storing a vector. The vector comprises a plurality of vector elements. A pipeline processing unit is connected to a selector associated with the vector registers for receiving, in sequence, the elements of a first vector from a first vector register and for performing an arithmetic operation on the elements of the first vector to yield a resultant vector. The elements of the resultant vector may be re-stored in corresponding locations of the first vector register or in another vector register.

However, with this configuration, it is necessary to perform operations on each of the elements of a vector in sequence. The time required to complete operations on all 256 elements of a 256 element vector is a function of the cycle time of the pipeline unit per operation on each of the elements.

With increasing sophistication of computer systems, it has become increasingly evident that there is a need to increase the performance of the vector processor portion of the computer system by decreasing the time required to process or perform arithmetic operations on each of the elements of a vector or on each of the corresponding elements of a plurality of vectors stored in the vector registers within the computer system.

SUMMARY OF THE INVENTION

Accordingly, it is a primary object of the present invention to increase the performance of the vector processor portion of a computer system by decreasing the time required to process the elements of a vector stored in a vector register comprising said vector processor portion of the computer system.

It is a further object of the present invention to increase the performance of the vector processor portion of the computer system by subdividing the plurality of vector registers into a plurality of smaller registers, and processing in parallel each of the elements of a vector stored in the smaller registers of a vector register.

It is a further object of the present invention to further increase the performance of the vector processor portion of the computer system by connecting a plurality of units, comprising the plurality of smaller registers, in a parallel configuration and processing in parallel the elements of a vector stored in the smaller registers of a vector register.

These and other objects are accomplished, in accordance with the present invention, by reducing the time required to complete processing operations on all elements of a single vector. The vector registers are subdivided into a plurality of smaller registers, each of which store, for example, four elements of a 256 element vector. An element processor is associated with each smaller register, the element processor performing the same function as the pipeline processing unit. Each element processor, and corresponding smaller register, comprise a unit. A plurality of units are connected in a parallel configuration. With this configuration, when an arithmetic operation is performed on the elements of a single vector, stored in a vector register, the arithmetic operation is completed in approximately the same time which would be required to complete an arithmetic operation on four elements of the vectors utilizing the typical vector processor of FIG. 1. As a result, the performance of the vector processor is improved substantially as a result of utilization of the present invention.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention would become obvious to one skilled in the art from the detailed description.

BRIEF DESCRIPTION OF THE DRAWINGS

A full understanding of the present invention will be obtained from a reading of the detailed description given hereinbelow and the accompanying drawings, which are given by way of illustration only, and thus are not limitative of the present invention, and wherein.

DETAILED DESCRIPTION OF THE PREFERRED EMBODIMENT

Figure 1:
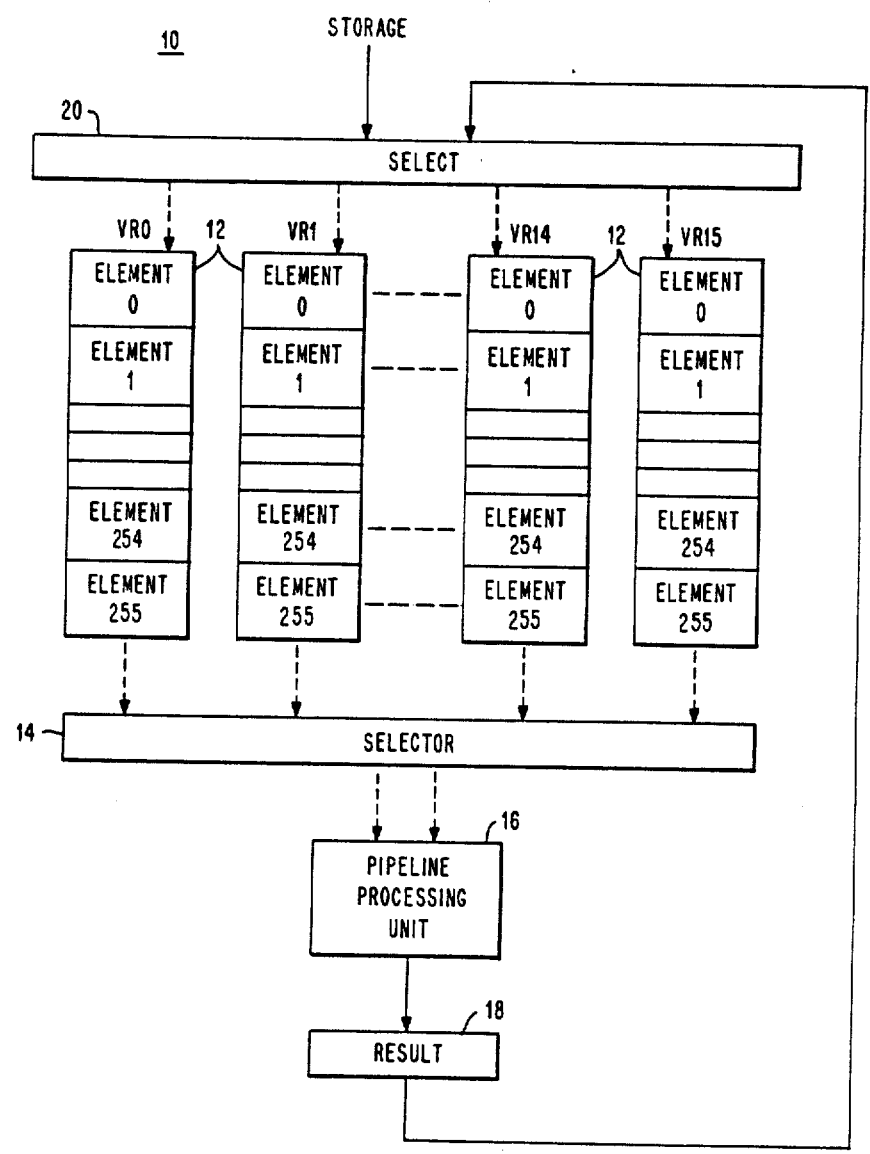
FIG. 1 illustrates a typical vector processor.

Referring to FIG. 1, a pipeline vector processor 10 is illustrated. In FIG. 1, a plurality of vector registers 12 (VR0 through VR15) are shown, each register storing 256 elements (element 0 through element 255). In the preferred embodiment, an element comprises a four (4) byte binary word. A selector 14 is connected to each of the vector registers 12 for selecting corresponding elements from the vector registers 12 and gating the selected elements through to a pipeline processing unit 16. The pipeline processing unit 16 is connected to the selector for receiving the corresponding elements and for performing selected operations on said elements, such as arithmetic operations. For example, the processing unit 16 may receive element 0 from vector register VR0 and element 1 from vector register VR0 and perform an addition operation on said elements. Processing unit 16 may then receive element 2 from vector register VR0 and add this element to the previous sum, forming another sum. Processing unit 16 may continue to add the remaining elements of vector register VR0, in sequence, to the stored sum, forming a final sum of the elements constituting the vector stored in vector register VR0. A result register 18 is connected to the pipeline processing unit for storing the final sum received from the pipeline processing unit. The result register 18 is connected to each of the vector registers 12 via a select gate 19 for transferring the final sum from the result register 18 to another vector register, if desired.

However, the vector processor configuration illustrated in FIG. 1 possesses certain differences with respect to the vector processor configuration of the present invention. Utilizing the example, a first element is selected from register VR0 and a second element is selected from register VR0. The elements are added in the above manner. A third element is selected from register VR0 and added to the previous sum in the above manner. Each of the 256 elements must be selected from register VR0 and added together, in sequence, in order to provide a final sum of the elements constituting the vector stored in vector register VR0. As a result, the time required to complete the processing of the vector stored in vector register VR0 is a function of the number of elements per vector and the cycle time required to process one element per vector. The performance of a vector processor could be improved by decreasing the time required to process a vector stored in a vector register.

Figure 2:
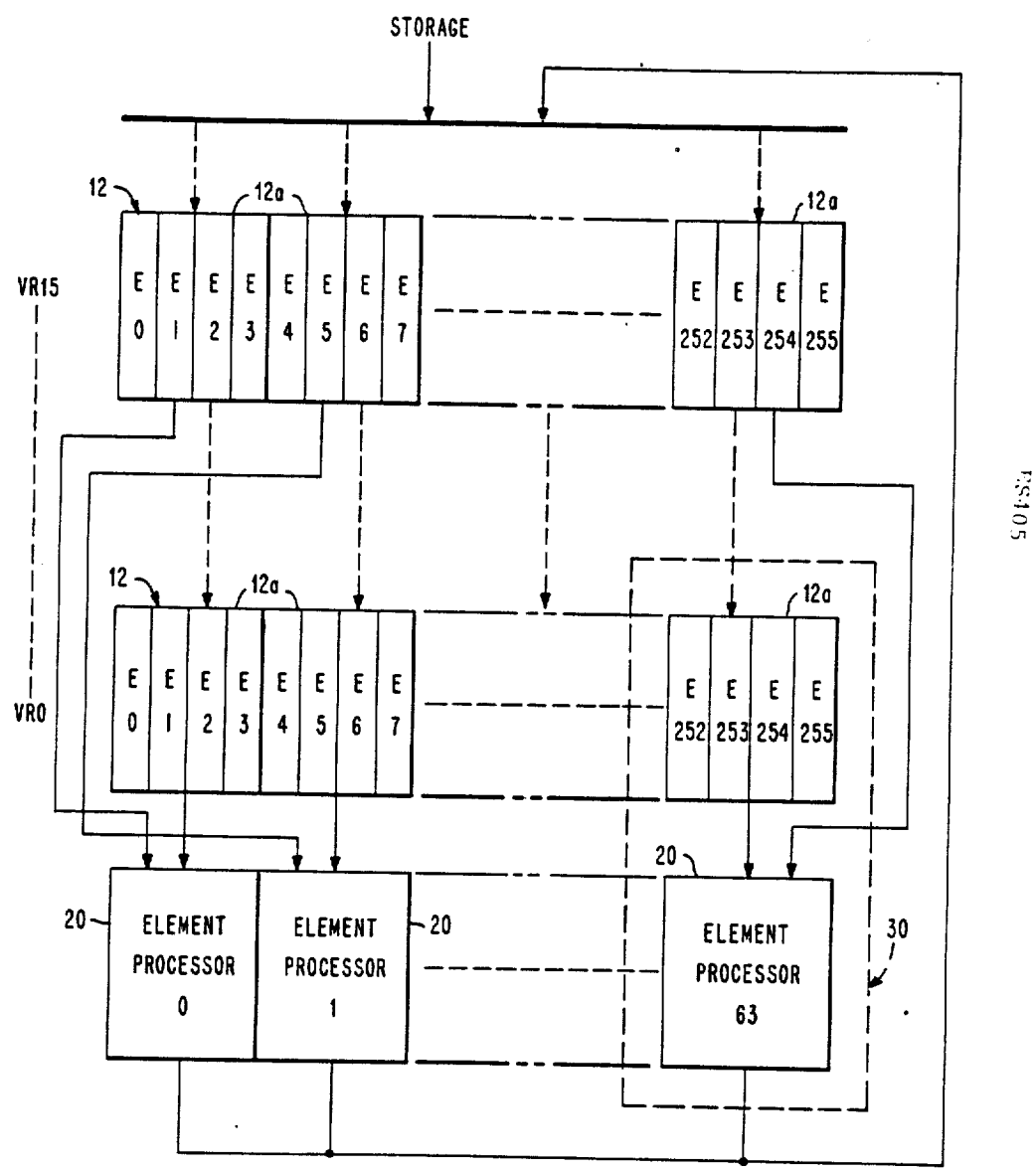
FIG. 2 illustrates a parallel vector processor according to the present invention.

Referring to FIG. 2, a parallel vector processor is illustrated. In FIG. 2, each of the vector registers VR0 through VR15 of FIG. 1 store an N element vector. Each of the vector registers VR0 through VR15 are subdivided into a plurality of smaller registers 12a. Each of the smaller registers 12a store M elements of the N element vector, where M is less than N. For example, if vector registers VR0 through VR15 each store a 256 element vector, a smaller register 12a may store four elements of the 256 element vector. A corresponding plurality of element processors 20 are connected to the plurality of smaller registers 12a for performing processing (arithmetic) operations on the elements of a vector stored in a vector register. Utilizing the example, each of the element processors 20 perform processing operations on four elements of a vector. The results of the processing operation are simultaneously produced by each element processor, in parallel, and may be stored in corresponding locations of any one of the vector registers VR0 through VR15.

Figure 3:
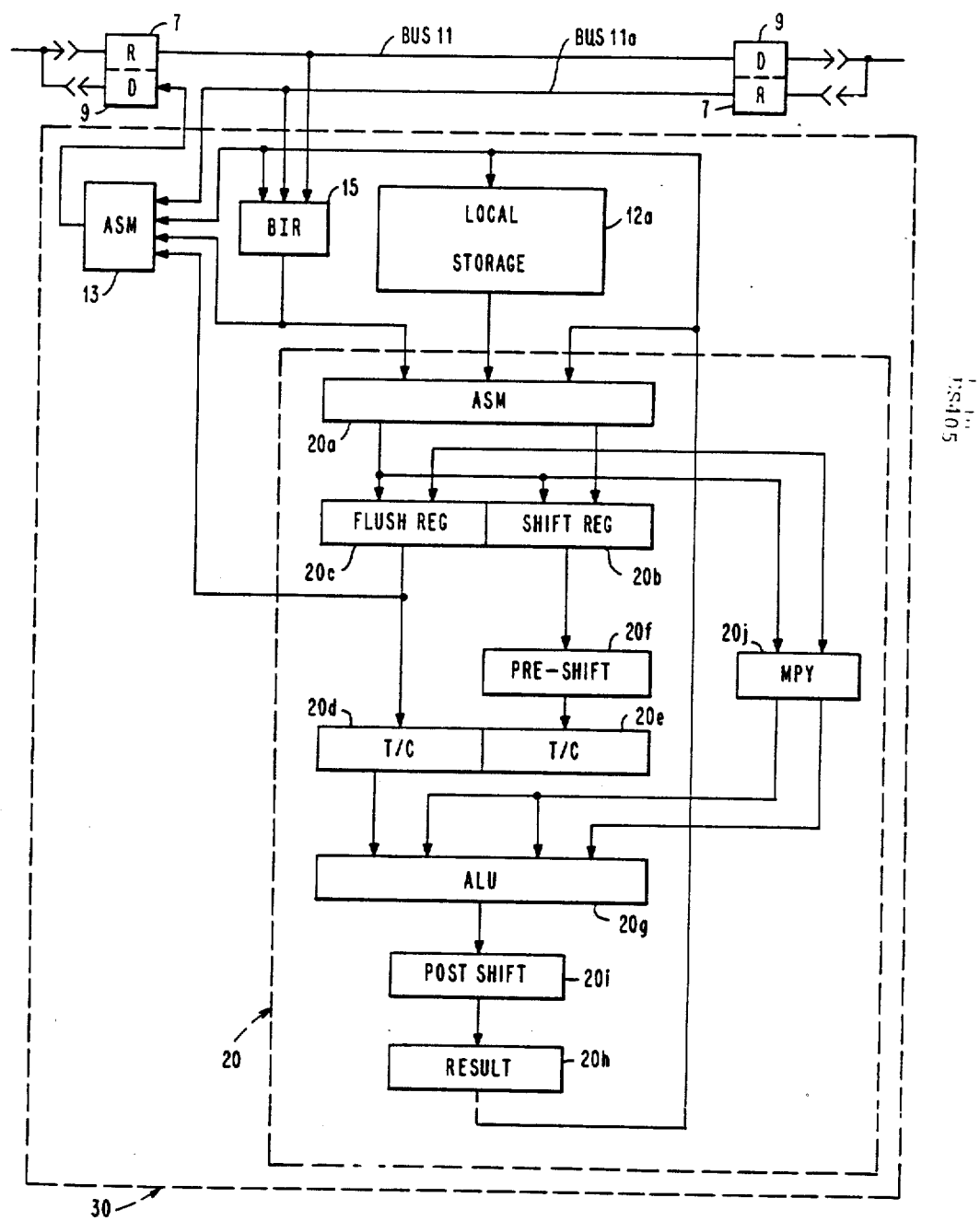
FIG. 3 illustrates a detailed construction of an element processor shown in FIG. 2.

Referring to FIG. 3, a block diagram construction of an element processor 20 is illustrated. In FIG. 3, a local storage 12 is the vector registers 12 shown in FIG. 2 of the drawings. A system bus 11 and 11a is connected to a driver circuit 9 on one end and to a receiver circuit 7 on the other end. A first input data assembler (ASM) 13 is connected to a driver circuit 9 and to a receiver circuit 7. The ASM 13 is further connected to local storage 12 and to the element processor 20. The element processor 20 shown in FIG. 3 comprises a second input data assembler (ASM) 20a connected to the local storage 12 and to the first input data assembler 13. A bus interface register (BIR) 15 is connected to bus 11 and bus 11a on one end and to the second input data assembler 20a on the other end. A shift select register 20b and a flush select register 20c are connected to the input data assembler 20a. The flush select register 20c is connected directly to a trues/complement gate 20d whereas the shift select register 20b is connected to another trues/complement gate 20e via a pre-shifter control 20f. The true/compliment gates 20d and 20e are each connected to an operation means, such as an arithmetic logic unit (ALU) 20g. The ALU 20g is connected to a result register 20h via a post shifter control 20i, the result register 20h being connected to the local storage 12 for storing a result therein when the element processor 20 has completed an arithmetic processing operation on the four elements of a vector stored in the smaller register 12a of a vector register 12. A multiplier circuit 20j is interconnected between the input data assembler 20a and the ALU 20g. Two operands are received by the multiplier circuit 20j. A sum output and a carry output is generated by the multiplier circuit 20j, the sum and carry outputs being received by the ALU 20g.

Figure 4:
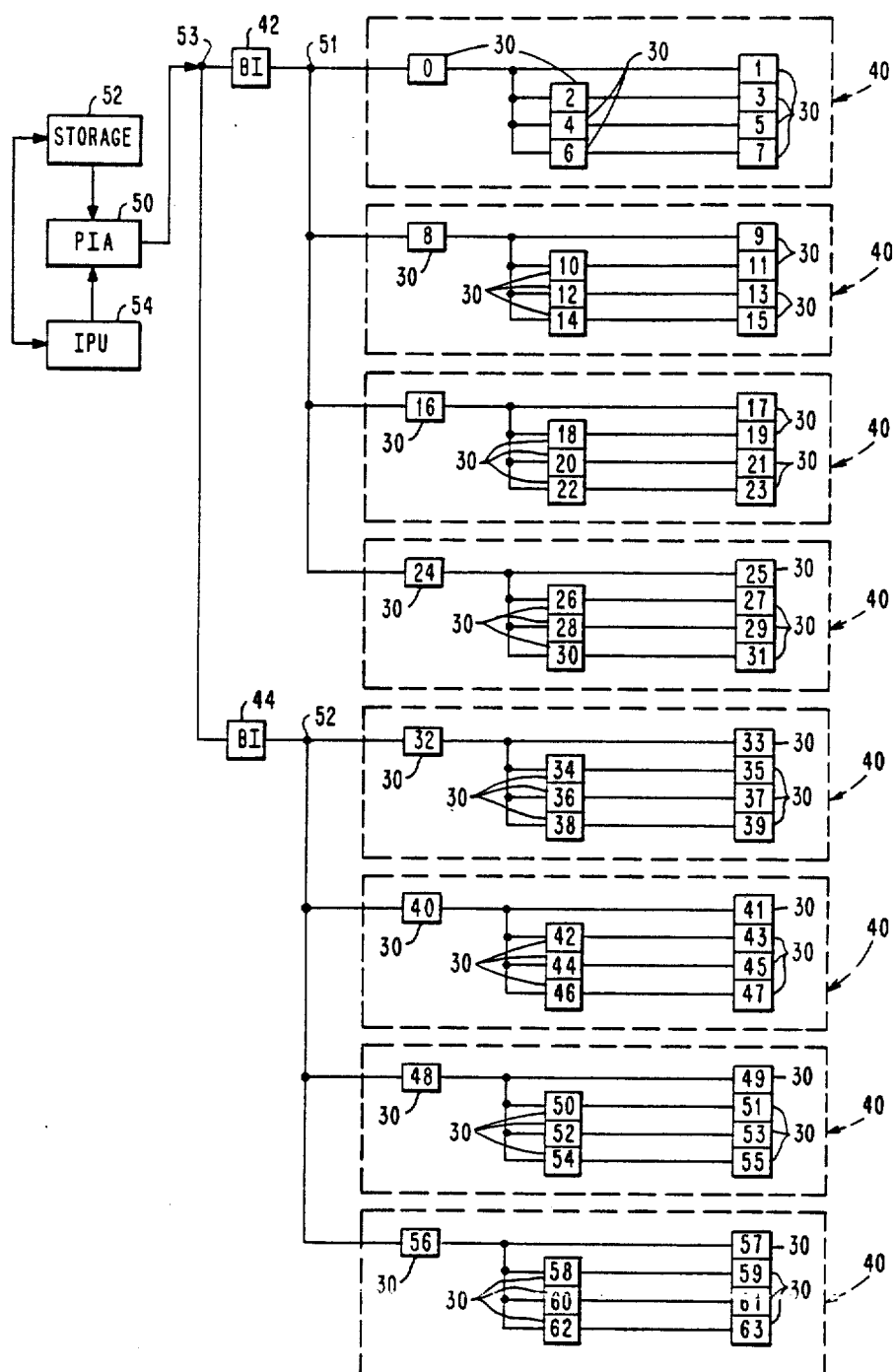
FIG. 4 illustrates a further construction of the interconnection of the element processors and smaller registers of FIG. 2 according to the present invention.

Referring to FIG. 4, according to the present invention, blocks 0 through 63 are illustrated, each block being a unit 30. Furthermore, each unit 30 represents, in combination, a smaller register 12a, and an associated element processor 20. The units 30 are connected together in a parallel configuration, as indicated in FIG. 4, for increasing the speed by which the elements of a vector, stored in a vector register, are added together to yield a result indicative of the sum of the elements of said vector.

For ease of description, refer to FIGS. 2 or 3 and note that an element processor 20, in association with its corresponding smaller register 12a, collectively comprise one unit, identified by feature numeral 30. Referring to FIG. 4, each of the blocks labelled 0 through 7 represent the unit 30 of FIGS. 2 or 3. Blocks 0 through 7, collectively, comprise an overall unit 40. A plurality of overall units 40 are connected in a parallel configuration. Four of the overall units 40 are connected together at one junction 51 and four of the remaining overall units 40 are connected together at another junction 52. In addition, four of the overall units 40 correspond to a 128 element vector stored in the smaller registers 12a of blocks 0 through 31, and four of the remaining overall units 40 correspond to another 128 element vector stored in the smaller registers 12a of blocks 32 through 63. Therefore, the configuration of FIG. 4 is capable of providing a sum total of the elements of a 256 element vector. Junction 51 is connected to a bi-directional driver 42 and junction 52 is connected to another bi-directional driver 44. Each of these drivers are connected together, at their outputs, to a further junction 53. A processor interface adaptor (PIA) 50 is connected to junction 53 for directing the functional operation of the plurality of units 30 which comprise the plurality of overall units 40. A storage, or main memory, 52 is connected to the PIA 50. An instruction processing unit (IPU) 54 is connected to the PIA 50 and to the storage 52.

Figure 5:
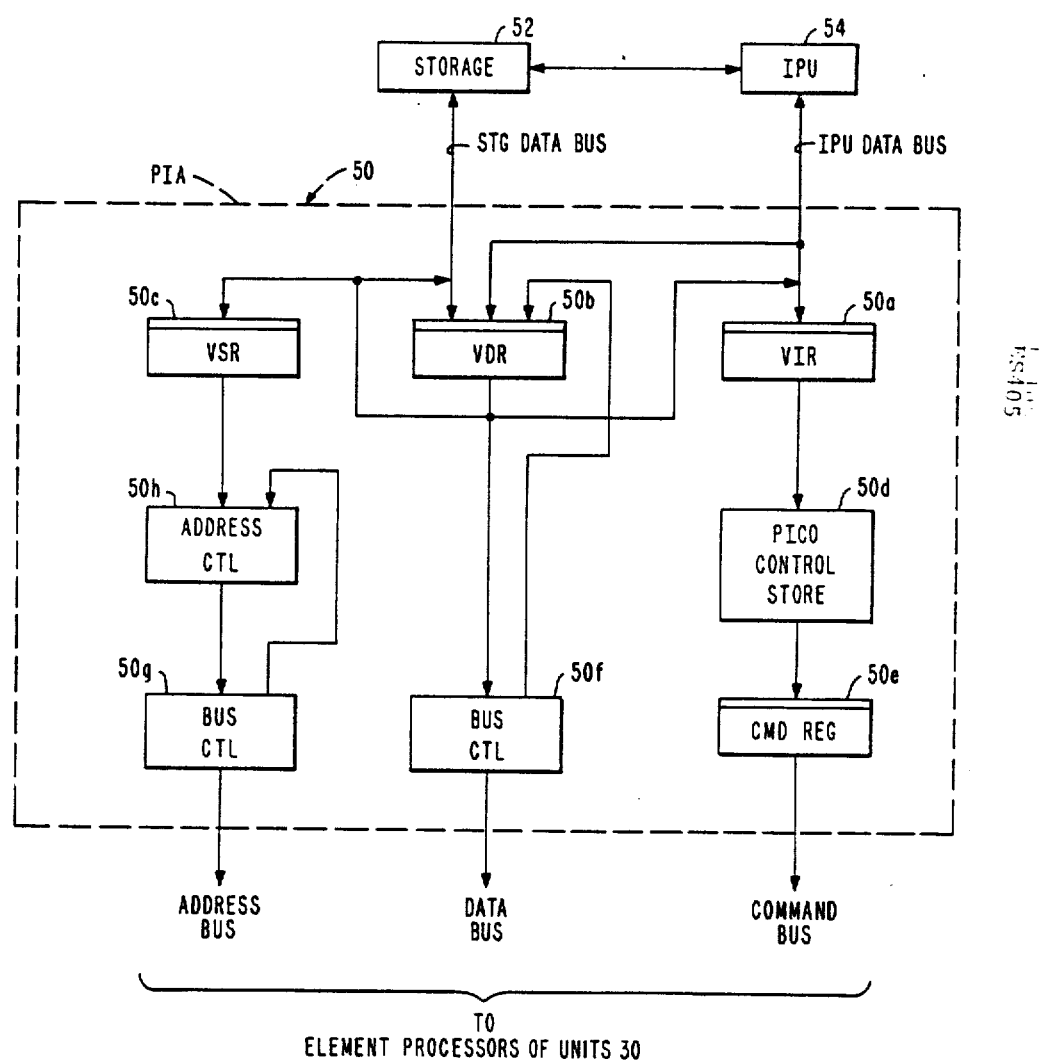
FIG. 5 illustrates the construction of the Processor Interface Adaptor of FIG. 4.

Referring to FIG. 5, the construction of the PIA 50 is illustrated. The PIA 50 includes a vector instruction register (VIR) 50a connected to the IPU 54 for receiving a vector instruction from the IPU and temporarily storing the vector instruction. A vector data register (VDR) 50b is connected to storage 52 and to the IPU 54 for receiving data from storage 52 and temporarily storing the data. A vector status register (VSR) 50c is connected to the storage 52 and to IPU 54 for receiving the data from storage and for temporarily storing the data. A pico control store 50d is connected to the VIR 50a for decoding the vector instruction stored in the VIR 50a and for selecting a pico control routine stored in the store 50d. A command register 50e is connected to the pico control store 50d and to the element processors of units 30 via a command bus for driving the element processors. A bus control 50f is connected to the VDR 50b and to the element processors of units 30 for receiving data from the VDR 50b and transmitting the data to the element processors 20 of units 30 via a data bus. The bus control 50f can also steer data from one element processor to another element processor. The VSR 50c is also connected to a bus control 50g via an address control 50h. The address control 50h generates addresses corresponding to the data received from the VSR 50c. The bus control 50g is connected to the element processors 20 or units 30 for transmitting the generated addresses to the element processors 20 of units 30 via an address bus.

The functional operation of the interelement processor in accordance with the present invention will be described in the paragraphs below with reference to FIGS. 3 through 5 of the drawings.

Assume that the IPU 54 has already directed the PIA 50 to load data from storage 52 into one or more of vector registers VR0 through VR15 via element processors 20. Assume further that each vector register VR0 through VR15 is 256 elements in length. As a result, a 256 element vector is assumed to reside in one or more of the vector registers 12. When a 256 element vector is stored in one or more vector registers 12, the IPU 54 instructs the PIA 50 to execute an INTERNAL ACCUMULATE instruction. When the INTERNAL ACCUMULATE instruction is executed, each of the elements stored in a smaller register 12a are added together yielding an intermediate summation element, the intermediate summation element being stored in the result register 20h associated with the corresponding processor 20 connected to the smaller register. When executing the INTERNAL ACCUMULATE instruction, the PIA 50 instructs the element processor 20 associated with each unit 30 to retrieve the first element and the second element from its corresponding smaller register 12a. Utilizing the example, assume that four elements are stored in each smaller register 12a. The first and second elements of each smaller register 12a are passed to their corresponding processors 20. Under control of the IPU 54, the PIA 50 instructs the processors 20 to add the first and second elements and to store the sum in the result register 20h associated with processors 20. Each of the processors 20 perform the summation operation and store the sum in the result register 20h. The PIA 50, under the control of the IPU 54, instructs each of the element processors 20 to retrieve the third element from their corresponding smaller registers 12a, add the third element to the sum stored in the result register 20h, and store a further sum in the result register 20h. When the processors 20 execute this further instruction, the PIA 50 instructs each of the processors 20 to retrieve the fourth element from their corresponding smaller registers 12a, add the fourth element to the further sum stored in their corresponding result registers 20h, and store the sum of the four elements in the corresponding result registers 20h. As a result, an intermediate summation element is stored in the result register 20h of each processor 20 corresponding to each unit 30. The intermediate summation element represents the sum of the four elements stored in their corresponding smaller registers 12a.

The PIA 50, under the control of the IPU 54, directs all the processors 20, associated with units 30, to add the intermediate summation elements together, thereby producing a final total. The processors 20 add the intermediate summation elements together in the following manner.

The intermediate summation element stored in unit 30/block 1 is added to the intermediate summation element stored in unit 30/block 0, the sum remaining in storage in unit 30/block 0. The intermediate summation element stored in unit 30/block 3 is added to the intermediate summation element stored in unit 30/block 2, the sum being stored in unit 30/block 2. The intermediate summation element stored in unit 30/block 5 is added to the intermediate summation element stored in unit 30/block 4, the sum being stored in unit 30/block 4. The intermediate summation element stored in unit 30/block 7 is added to the intermediate summation element stored in unit 30/block 6, the sum being stored in unit 30/block 6. Therefore, subtotals are stored in units 30/blocks 0, 2, 4, and 6 of the first overall unit 40. The second through the eighth overall units 40 undergo a similar functioning in that subtotals are stored in the following additional units 30: 8, 10, 12, 14, 16, 18, 20, 22, 24, 26, 28, 30, 32, 34, 36, 38, 40, 42, 44, 46, 48, 50, 52, 54, 56, 58, 60, and 62.

The subtotal stored in unit 30/block 2 is added to the subtotal stored in unit 30/block 0, the new subtotal being stored in unit 30/block 0. The subtotal stored in unit 30/block 4 is added to the new subtotal stored in unit 30/block 0, another new subtotal being stored in unit 30/block 0. The subtotal stored in unit 30/block 6 is added to the another new subtotal stored in unit 30/block 0, a further subtotal being stored in unit 30/block 0. The second through the eighth overall units 40 undergo a similar functioning in that further subtotals are stored in the following additional units 30: 8, 16, 24, 32, 40, 48, and 56.

The further subtotal stored in unit 30/block 8 is added to the further subtotal stored in unit 30/block 0, a first further subtotal being stored in unit 30/block 0. The further subtotal stored in unit 30/block 16 is added to the first further subtotal stored in unit 30/block 0, a second further subtotal being stored in unit 30/block 0. The further subtotal stored in unit 30/block 24 is added to the second further subtotal stored in unit 30/block 0, a third further subtotal being stored in unit 30/block 0. The further subtotals stored in blocks 32, 40, 48, and 56 are added together in a similar fashion, a fourth further subtotal being stored in unit 30/block 32. The fourth further subtotal stored in unit 30/block 32 is added to the third further subtotal stored in unit 30/block 0 via bi-directional drivers 44 and 42, a final total being stored in unit 30/block 0. The final total represents the sum of all the elements constituting the 256 element vector stored in a vector register. The final total is available for use by IPU 54.

The functional operation of the element processor 20 shown in FIG. 3 may be subdivided into four cycles of operation: a read local storage and shift select cycle, alternatively known as a first cycle; a pre-normalize shift cycle, known as a second cycle; an ALU operation cycle, known as a third cycle; and a post-normalize shift cycle, known as a fourth cycle.

Assume that the PIA 50 has directed each of the processors 20 to add the elements of their smaller registers together and store the results of the summation operation in result register 20h. PIA 50 instructs each of the processors 20 to retrieve their respective four elements from their corresponding smaller registers 12a (from local storage) associated with vector registers 12. Directing attention to the functional operation of element processor 0, elements 0 through 3 are received from storage 52 by receiver 7 via bus 11a and stored in local storage 12 via ASM 13. The local storage 12 is the vector register 12 shown in FIG. 2 which stores elements 0 through 3. Assume further that the elements 0 through 3 represent floating point element operands.

When the PIA 50 directs element processor 0 (20) to add elements 0 through 3 together and to store the sum in the result register 20h, on the first cycle, the operands of the first two elements (of the four element vector) are read from the local storage 12 and are temporarily stored in the flush register 20c and the shift register 20b via the input data assembler 20a. However, at the same time, the exponents of the respective elements enter an exponent control path (not shown) where the difference in magnitude of the exponents is calculated. Therefore, the element having the smaller exponent is gated to the shift select register 20b whereas the element having the greater exponent is gated to the flush select register 20c. The flush and shift select registers 20c and 20b are latched by a latch clock at the end of the first cycle.

At the beginning of the second cycle, a shift operation is started. The element having the greater exponent, stored in the flush select register 20c, is gated into one input of the arithmetic logic unit (ALU) 20g. Shift control information is passed from the exponent control path (not shown) to the pre-shifter 20f wherein the element having the smaller exponent, stored in the shift select register 20b, is right-shifted by the pre-shifter 20f to align said element with the element having the greater exponent, which is currently being gated into the one input of the ALU 20g. Concurrently, the ALU 20g is selecting the appropriate inputs from the trues/-complement gates 20d and 20e for receiving the elements from the flush and shift select registers 20c and 20b via the trues/complement gates 20d and 20e, respectively.

The third cycle, in the operaton of the element processor 20 of FIG. 3, is dedicated to the functional operation of the arithmetic logic unit (ALU) 20g. The ALU is an 8-byte high speed carry look ahead adder, designed with 1's complement arithmetic and with end around carry and recomplementation. The ALU performs an addition operation, wherein the bits of four respective elements, in the example, elements 0 through 3 stored in the smaller registers 12a of element processor 0, associated with vector register VR0, are added together. The results of the addition operation are ultimately stored in the local storage 12. However, prior to this step, a post-normalization step must take place during the fourth cycle.

When the addition operation is completed by the ALU 20g, a post-normalization step takes place during the fourth cycle. The term "post-normalization", in data processing terms, comprises the steps of detecting leading zero hexadecimal digits in the results produced by the ALU, and left shifting the results in accordance with the number of zero digits detected. The results exponent must be adjusted by decrementing the exponent by a value of 1 for each digit shifted. Digits of the output of the ALU 20g are examined by the post shifter 20i for their zero state, and the results of the ALU output are left shifted in accordance with the number of zero digits detected. The left shifted results of the ALU output are passed to the result register 20h for temporary storage therein. The exponent control path (not shown) increments or decrements the exponent value of the result element (output from the ALU) so that a correct final exponent value is gated to the result register 20h. As a result, a result element is stored in the result register 20h, the operand of which is left shifted a proper amount in accordance with the number of zero digits detected in the ALU output, the exponent of which is the correct final exponent value. If desired, during the next cycle, following the fourth cycle, the result element is passed to the local storage 12 for storage therein. The functional operation repeats with respect to the remaining two elements to yield a sum of the four elements stored in result register 20h. The sum of the four elements is the intermediate summation element.

Due to the technological advance associated with integrated circuit packaging, the cost to produce integrated circuit chips is low. Therefore, the cost involved in the production of large quantities of integrated circuit chips is relatively low. As a result, it becomes economically justifyable to optimize the performance of a computer system, or the vector processor portion of the computer system, by utilizing an increased number of integrated circuit chips. The present invention utilizes this principle to optimize the performance of the vector processor portion of a computer system, and in particular, to optimize said performance relating to the summation of the elements of a single vector stored in a vector register.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:
1. A vector processor, comprising:
   a plurality of vector register means, each of said vector register means storing a vector, each of said vector register means being divided into a plurality of smaller register means, each of said smaller register means storing a plurality of elements of one of said vectors, said plurality of smaller register means having a plurality of outputs;
   a plurality of element processor means connected, respectively, to the plurality of outputs of said plurality of smaller register means, each of said element processor means being dedicated and connected to a different set of said smaller resisters to process any element within the dedicated set, each of said sets comprising one smaller register per vector register and wherein all the smaller registers in each set store corresponding vector elements of said vectors, each said element processor means processing said plurality of elements stored in the dedicated smaller register means thereby producing a result, said result being stored in said element processor means,
   each said element processor means and its plurality of corresponding smaller register means being a unit, the plurality of element processor means and the corresponding plurality of smaller register means forming a plurality of said units, said plurality of said units including a first group of said units and a second group of said units, a plurality of outputs corresponding to the units of said first group being connected, respectively, to a plurality of inputs corresponding to the units of said second group; instruction storage means for storing instructions including an instruction routine; and instruction processor means connected to said instruction storage means and to an output of at least one unit of said second group for receiving said instruction routine from said instruction storage means, executing said instruction routine, and generating output signals;

a plurality of the results stored in the units of said first group being processed, respectively, with a plurality of the results stored in the units of said second group in response to said output signals from said instruction processor means thereby producing a corresponding plurality of processed results, the processed results being stored in the respective units of said second group, the units of said second group including a first unit and remaining units, the processed results stored in said remaining units being processed, in parallel fashion, with the processed result stored in said first unit in response to said output signals from said instruction processor means thereby producing one result, said one result being stored in said first unit of said second group;

whereby said one result may be used by said instruction processor means during the execution of one of said instructions.

2. The vector processor of claim 1, wherein:

said plurality of units include a third group of said units and a fourth group of said units, a plurality of outputs corresponding to the units of said third group being connected, respectively, to a plurality of inputs corresponding to the units of said fourth group;

said instruction processor means is connected to an output of at least one unit of said fourth group;

the plurality of results stored in the units of said third group is processed, respectively, with the plurality of results stored in the units of said fourth group simultaneously with the processing of the plurality of results stored in the units of said first group with the respective plurality of results stored in the units of said second group in response to said output signals from said instruction processor means thereby producing a further plurality of processed results, the further plurality of processed results being stored in the units of said fourth group, the units of said fourth group includes a first unit and remaining units, the further processed results stored in said remaining units of said fourth group is processed, in parallel fashion, with the further processed result stored in said first unit of said fourth group simultaneously with the processing of the processed results in said remaining units of said second group with the processed result stored in said first unit of said second group in response to said output signals from said instruction processor means thereby producing another one result, said another one result being stored in said first unit of said fourth group;

said another one result stored in said first unit of said fourth group is processed, in parallel fashion, with said one result stored in said first unit of said second group in response to said output signals from said instruction processor means thereby producing a single result, said single result being stored in said first unit of said second group;

whereby said single result may be used by said instruction processor means during the execution of one of said instructions.

3. The vector processor of claim 1, further comprising:

command means connected to said instruction processor means and responsive to the execution of said instruction by said instruction processor means for transmitting command information to said plurality of units, said command information controlling the operation of said plurality of units as directed by said instruction routine;

address means connected to said instruction storage means and to said instruction processor means and responsive to the execution of said instruction by said instruction processor means for transmitting address information to said plurality of units which are a group of addresses identifying said plurality of units controlled by said command means; and data means connected to said instruction storage means and to said instruction processor means and responsive to execution of said instruction by said instruction processor means for transmitting data to said plurality of units.

4. The vector processor of claim 1, wherein each of said element processor means comprise:

read means for reading an element of said vector stored in said vector register means and another element of said vector stored in said vector register means;

register means connected to said read means for storing the elements read by said read means;

pre-shift means connected to the register means for shifting into alignment an operand associated with said element with an operand associated with said another element;

operation means connected to the pre-shift means for processing the elements thereby producing a set of results;

post-shift means connected to the operation means for receiving said set of results from said operation means and shifting the results a predetermined amount; and post operation storage means connected to the post-shift means for storing the set of results.

5. A vector processor, comprising:

a plurality of vector registers, wherein each vector register is subdivided into a plurality of smaller registers, each of said smaller registers has a separate output, each vector register stores a vector, and each of said smaller registers stores a plurality of elements of said vector, a plurality of element processor means, each of said element processor means being dedicated and connected to the outputs of a different set of said smaller registers for processing the elements within the dedicated set, each of said sets comprising one smaller register per vector register, and wherein all the smaller registers in each set store corresponding vector elements of said vectors; and controlling means for selecting which elements in which smaller registers to process, the plurality of element processor means processing, at least partially in parallel, the selected elements of different sets of said smaller registers.

6. A vector processor as set forth in claim 5, wherein each of said smaller registers of each vector register stores a plurality of consecutive vector elements.

7. A vector processor as set forth in claim 5 further comprising:
   means for processing a first result stored in a first one of said element processor means with a second result stored in a second one of said element processor means to yield a first intermediate result, and storing said first intermediate result in said second element processor means;
   means for processing a third result stored in a third one of said element processor means with a fourth result stored in a fourth one of said element processor means to yield a second intermediate result, and storing said second intermediate result in said fourth element processor means; and
   means for processing the second intermediate result stored in said fourth element processor means with the first intermediate result stored in said second element processor means to yield a fifth result, and storing said fifth result in said second element processor means.

8. A vector processor as set forth in claim 5 wherein each of said smaller registers stores elements of only one vector.

9. A vector processor as set forth in claim 5, wherein each set of smaller registers has a separate bus connecting the outputs of said smaller registers in said set to the dedicated element processor means.

* * * * *